R. R. VALE.
AUTOMOBILE WHEEL.
APPLICATION FILED JUNE 22, 1920.
1,382,031.
Patented June 21, 1921.
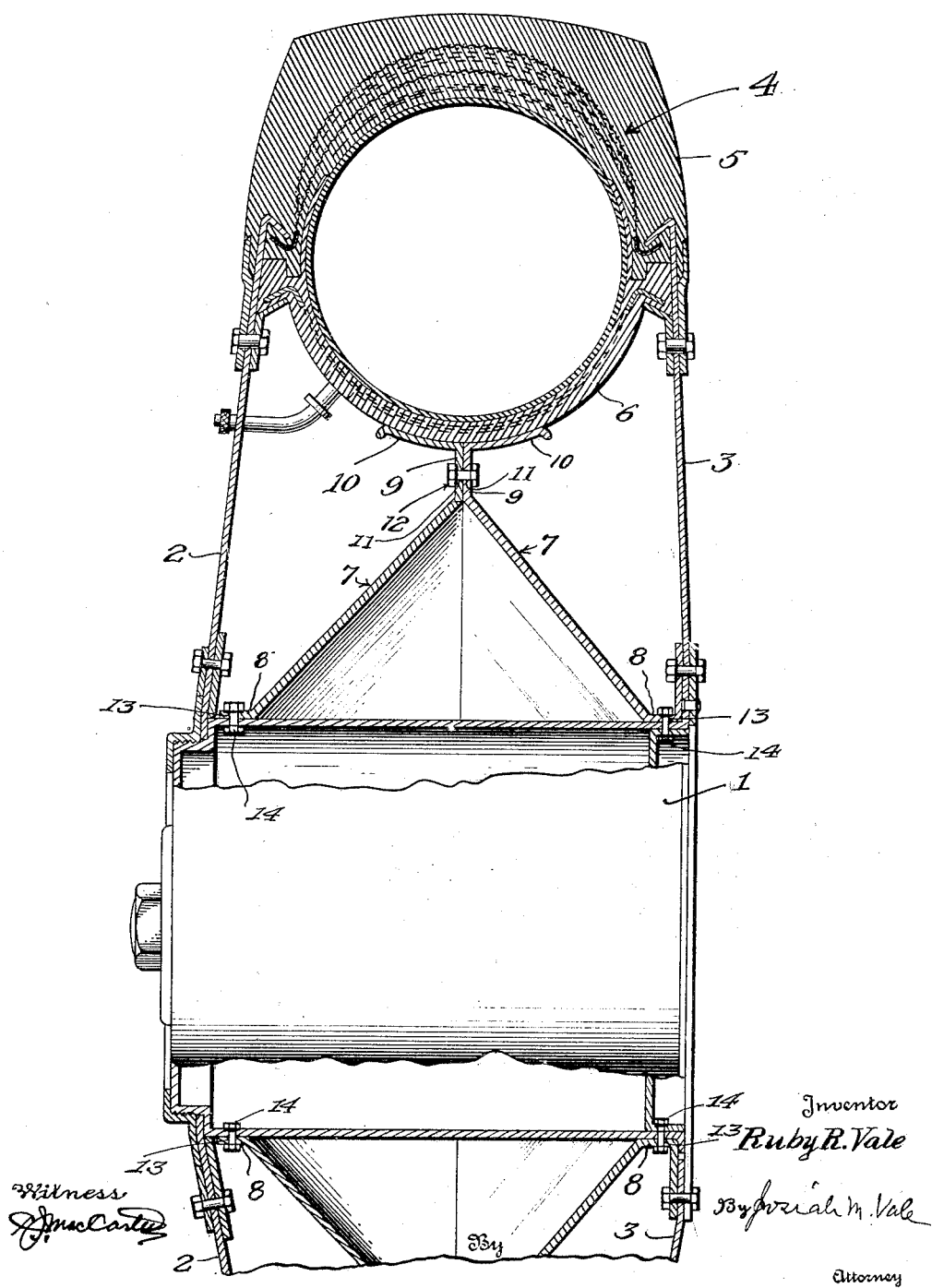
Inventor
Ruby R. Vale
By Josiah M. Vale
Attorney
Witness

UNITED STATES PATENT OFFICE.

RUBY R. VALE, OF MILFORD, DELAWARE.

AUTOMOBILE-WHEEL.

1,382,031.   Specification of Letters Patent.   Patented June 21, 1921.

Application filed June 22, 1920. Serial No. 390,793.

*To all whom it may concern:*

Be it known that I, RUBY R. VALE, a citizen of the United States, residing at Milford, in the county of Sussex and State of Delaware, have invented certain new and useful Improvements in Automobile-Wheels, of which the following is a specification.

My invention relates to an improvement in wheel structures and pertains particularly to a substitute for the felly of a wheel.

In my application dated June 14, 1920, filed June 22, 1920, Serial No. 390,794, I have described and shown an improvement in wheels and the tires associated therewith, the essential elements of which are a hub, inner and outer plates mounted on the hub and a cradle or standard arising perpendicularly from the hub, a two-part tire, comprising a tread section and a bottom or cradle section, the cradle section, resting on the cradle or standard for vertical support, and retaining means on the side walls for holding the two parts of the tire at the sides.

It is the object of my present invention to provide an improved form of cradle for the perpendicular support of the tire.

It is one of the objects of my invention to eliminate the stays described in the aforementioned application and to provide a cradle or tire-supporting element which is self-sustaining and which of itself will resist cross strains such as might be occasioned by skidding or from impact from ruts or inequalities in the road.

It is a further object of my invention to provide a tire-supporting element which might be applied without material modification to any of the tires now in general use by the public.

With these and other objects in view my invention comprises essentially a hub and two similar flanged plates of peculiar form. Each plate is in the form of a frusto conical or tapering wall terminating in an annular collar at its inner diameter and at its outer diameter being prolonged into a radially extending contact surface terminating at substantially right angles in a tire supporting flange, the contacting surfaces are rigidly fastened by means of bolts or other fastening means, and the annular collar of each plate is rigidly affixed to the hub of the wheel.

In the accompanying drawings the figure is a vertical section partially broken away through the wheel and tire showing the relation of the improved cradle to the tire.

The hub 1 of any preferred form has rigidly affixed to it in any preferred manner plates 2 and 3, at the outer peripheries of which the tire 4 comprising the outer or tread section 5 and the inner or cradle section 6 is connected.

The details of the two sections of the tire and of the fastening means connected to the plates 2 and 3 are all shown in the aforementioned application filed of even date herewith and since they form no part of this invention it is not believed further explanation of them is necessary.

The cradle is formed of two frusto conical plates 7 terminating at their inner peripheries in annular collars 8 and being prolonged at their outer peripheries into radially extending contacting surfaces 9, which terminate in the flanges 10 extending substantially at right angles thereto. The contacting surfaces have registering openings 11 formed therein through which bolts 12 pass to rigidly fasten the two together as shown in the figure.

The annular collar 8 and hub 1 have registering openings 13 through which bolts 14 pass to rigidly unite the hub and cradle section.

As can be noted from the drawing the flanges 10 form a supporting surface for the inner section 6 of the tire 4 and it will be obvious that these flanges might be prolonged and made of any desired form in order to support and hold any form of tire whether of two sections as illustrated or not.

It is believed that it will be apparent that owing to the divergence of the side walls of the cradle section from their point of contact to the hub, a rigidly braced structure will be provided which will resist strains from all directions.

I claim as my invention:

1. The combination with a hub and tire supporting means carried thereby of a cradle formed of two annular sections the sections of the cradle being joined toward their outer periphery and diverging from their jointures to their inner periphery and being fastened to the hub at their inner periphery.

2. The combination with a hub and tire supporting means carried thereby of an annular cradle secured to said hub and said tire supporting means, said cradle consisting of two sections joined at their outer periphery and having laterally diverging tire engaging flanges beyond their line of joinder, 3. The combination with a hub and tire supporting means carried thereby of an annular cradle secured at one side to said hub and at the opposite side to said tire supporting means and having a tire engaging central portion spaced from said hub and said tire supporting means.

4. The combination with a hub and tire engaging means carried thereby of a tire supporting cradle forming with said hub an annular three-sided body, substantially equilateral in radial cross-section.

In testimony whereof I hereunto affix my signature.

RUBY R. VALE.